United States Patent [11] 3,553,482

| [72] | Inventor | John R. Tavis<br>Mariposa, Calif. |
|---|---|---|
| [21] | Appl. No. | 743,856 |
| [22] | Filed | July 10, 1968 |
| [45] | Patented | Jan. 5, 1971 |
| [73] | Assignee | Tavis Corporation<br>Mariposa, Calif.<br>a corporation of California. by mesne assignments |

[54] ACCELERATION SWITCH
9 Claims, 14 Drawing Figs.

| [52] | U.S. Cl. | 307/121, 200/61.45, 200/61.53 |
|---|---|---|
| [51] | Int. Cl. | H01h 35/02 |
| [50] | Field of Search | 307/121; 200/61.45, 61.53; 340/262 |

[56] References Cited
UNITED STATES PATENTS

| 2,802,204 | 8/1957 | Kennelly et al. | 340/262 |
| 3,180,951 | 4/1965 | Preisz | 200/61.45 |
| 3,278,766 | 10/1966 | Ticknor | 307/121X |
| 3,333,111 | 7/1967 | Houle | 307/134X |
| 3,410,359 | 11/1968 | Mollison | 200/61.45X |

Primary Examiner—Robert K. Schaefer
Assistant Examiner—T. B. Joike
Attorney—Christie, Parker and Hale ABSTRACT: An acceleration switch having a pair of contacts arranged to open or close when subjected to a predetermined acceleration. One contact serves as a seismic mass and is mounted on a cantilevered beam which preferably is a tapered constant-stress leaf spring. The spring is pre-stressed and is substantially flat and normal to a sensitive axis of the switch to minimize response to cross-axis forces. The contacts are coupled to a low-voltage low-current electrical circuit which provides a current output when the contacts are opened or closed at the set-point acceleration. The circuit is arranged to suppress switch response to vibratory forces which may be present with the static acceleration to be sensed.

PATENTED JAN 5 1971

INVENTOR.
JOHN R. TAVIS

BY
Christie, Parker & Hale
ATTORNEYS

INVENTOR.
JOHN R. TAVIS
BY
Christie, Parker & Hale
ATTORNEYS

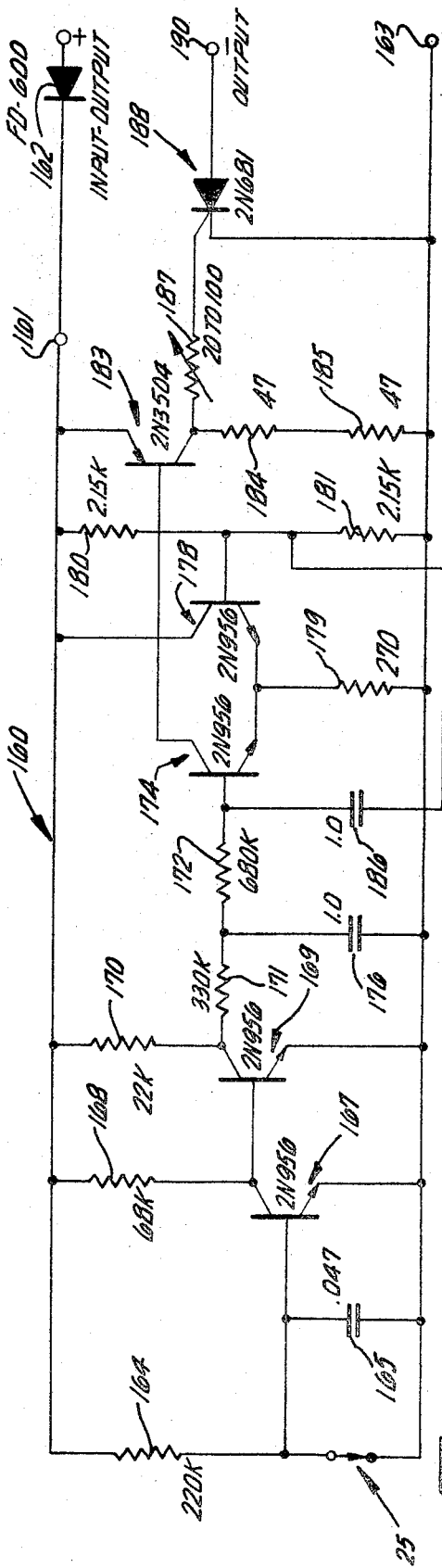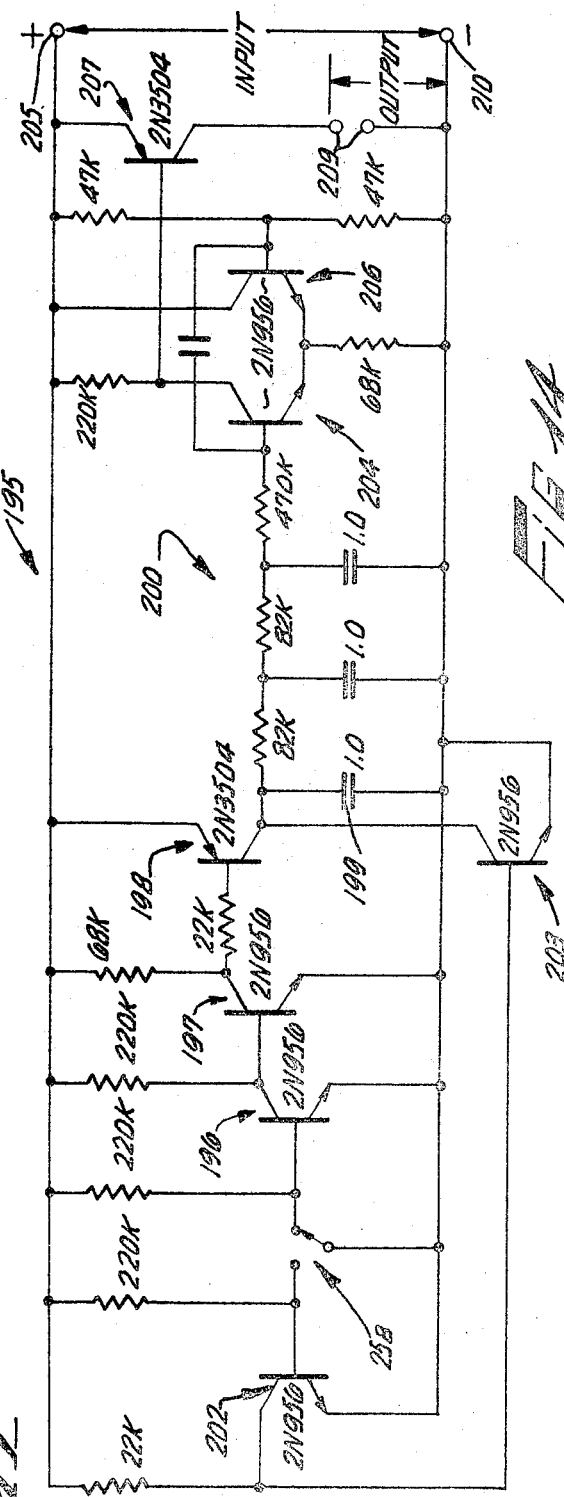

3,553,482

ACCELERATION SWITCH

BACKGROUND OF THE INVENTION

This invention relates to an acceleration switch or "g" sensor which actuates at a preset level of acceleration to operate or control another device. The switch is small and rugged, and has a fast response time when subjected to set-point static acceleration along its sensitive axis. Undesired response of the switch to vibration is suppressed by electronic circuits coupled to the switch contacts, and undesired response to cross-axis acceleration is minimized by the geometry of the moving elements of the switch. The circuits can be arranged to switch an output current either on or off when the preset static acceleration is sensed, and this current in turn operates a relay or other device to be actuated in response to this acceleration. Contact movement is very small to provide rapid switch response, and an adjustment is provided to vary the set-point acceleration. The switch is useful in a variety of applications in the aircraft and missile fields, or in any moving system when a specific preset static-acceleration level (or acceleration above or below this level) is to be detected.

SUMMARY OF THE INVENTION

Briefly stated, the acceleration switch of this invention includes a hollow sealed housing in which a fixed contact is mounted. A movable contact is resiliently supported in the housing by a suspension means such as a constant-stress leaf spring, and the movable contact is movable against and away from the fixed contact in response to acceleration along a sensitive axis of the switch. A circuit means is mounted in the housing and is coupled to the fixed and movable contacts to be actuable by the contacts to provide a first output condition when the acceleration is below a preset level, and a second output condition when the acceleration is at least as high as the preset level.

Preferably, the switch further includes a stop member mounted in the case and adjustably positionable in a direction parallel to the sensitive axis, the movable contact being positioned between the fixed contact and the stop member and being movable therebetween in response to acceleration to open and close the switch. The movable-contact suspension means is a flat leaf when mounted in the switch, the leaf having a major plane which is normal to the sensitive axis. Preferably, the fixed contact is resiliently supported to be movable within a limited range when contacted by the movable contact.

The circuit means includes means for modifying the effective opening and closing time of the switch by delaying a change in one of the output conditions in response to a change in relative position of the fixed and movable contacts. The circuit means further includes means for suppressing switch response to vibratory inputs while retaining sensitivity to static-acceleration inputs. The switch can also be vibrated in a double-throw configuration by mounting a second fixed contact on the stop member.

BRIEF DESCRIPTION OF THE DRAWINGS

The invention will be described in detail with reference to the attached drawings, in which:

FIGS. 10-14 are schematic diagrams of several electronic circuits useful in the switch.

DESCRIPTION OF THE PREFERRED EMBODIMENTS

Figure 1:
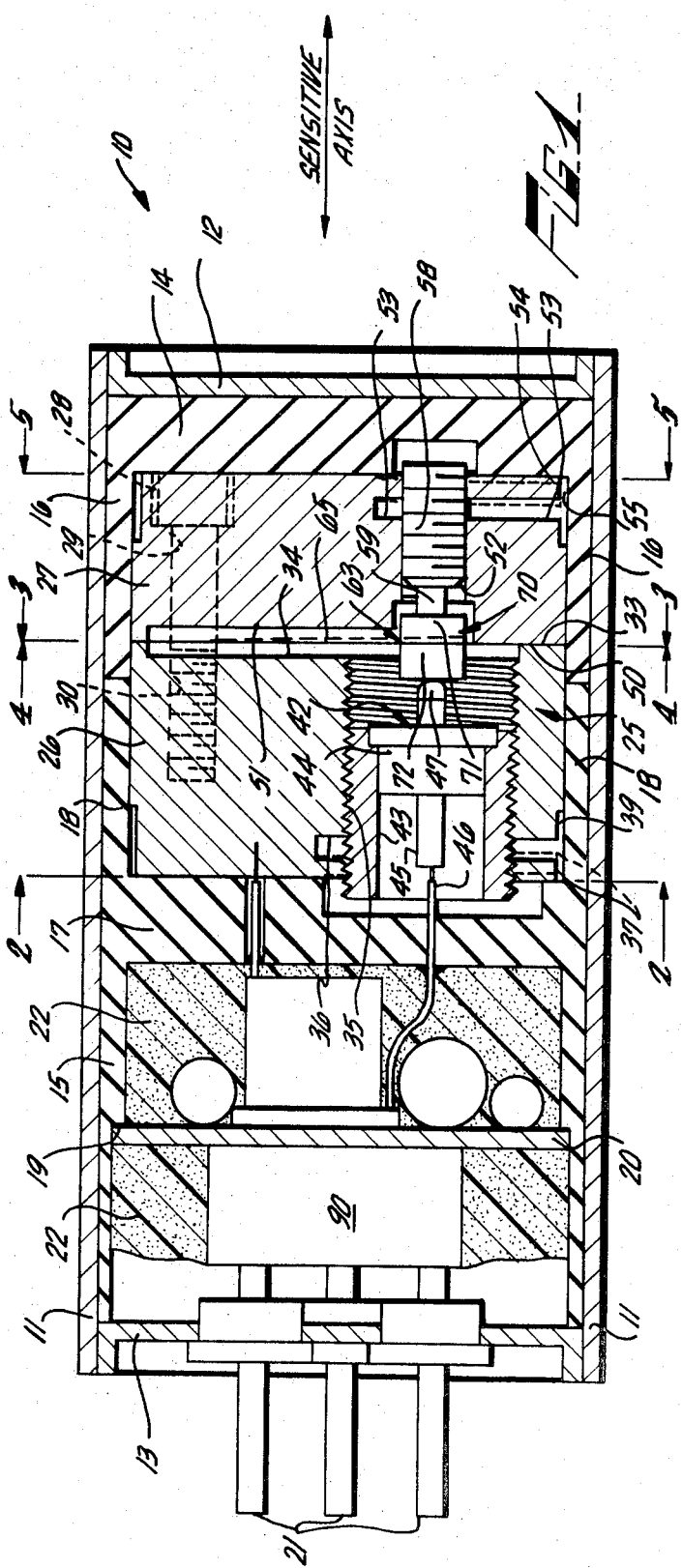
FIG. 1 is a sectional elevation of an acceleration switch according to the invention.

FIG. 1 shows an acceleration switch 10 which is mounted in a tubular outer housing 11 having a pair of end plates 12 and 13 secured to its opposite ends. Preferably, the switch is hermetically sealed by welding or otherwise solidly securing the end plates to the housing. A pair of cylindrical inner housings 14 and 15 are fitted snugly within outer housing 11 between the end plates, and are formed of an electrically insulating material such as plastic material sold under the trademark "Delrin."

Inner housing 14 has a solid base which abuts the inner face of end plate 12, and an annular flange 16 extends from this base toward end plate 13. Inner housing 15 has a central divider wall 17, and an annular flange 18 extends from the divider wall toward end plate 12 to abut the end of flange 16. An annular step 19 is formed in the inner surface of inner housing 15 between divider wall 17 and end plate 13, and a circuit board 20 seats against step 19 and carries circuit components to be described in detail below. A plurality of conventional terminal pins 21 are connected to components on the circuit board, and extend outwardly through hermetic seals on end plate 13 for connection to external apparatus. The space on opposite sides of the circuit board is filled with a conventional potting material 22.

A contactor assembly 25 includes a fixed-contact mounting block 26 and a stop mounting block 27. These blocks are generally cylindrical in shape, and fit snugly within flanges 16 and 18 between divider wall 17 and the base of inner housing 14. The blocks are made of an electrically conducting material such as Type-303 stainless steel. A plurality of screws 28 hold the two blocks together, and the screws pass through clearance holes 29 in mounting block 27 into threaded holes 30 in mounting block 26.

Figure 3:
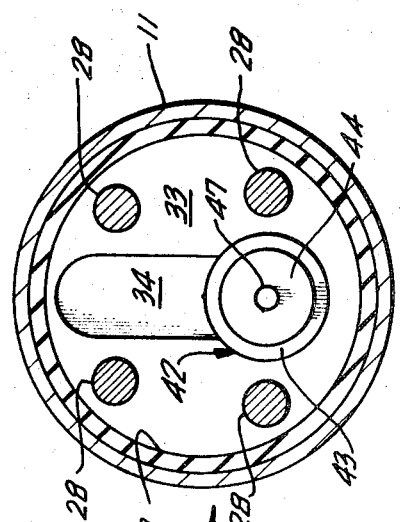
FIG. 3 is a view on line 3-3 of FIG. 1.
Figure 2:
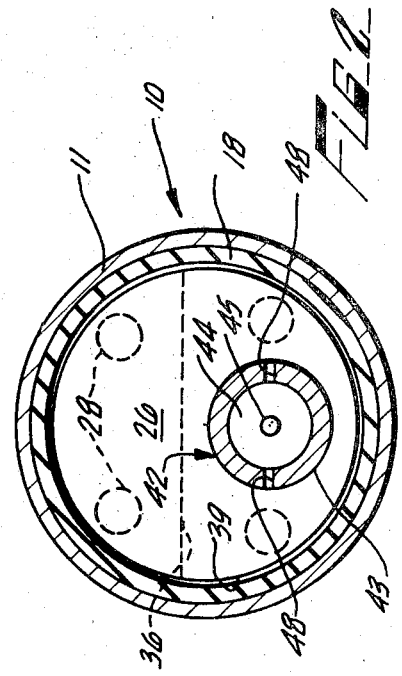
FIG. 2 is a view on line 2-2 of FIG. 1.
Figure 4:
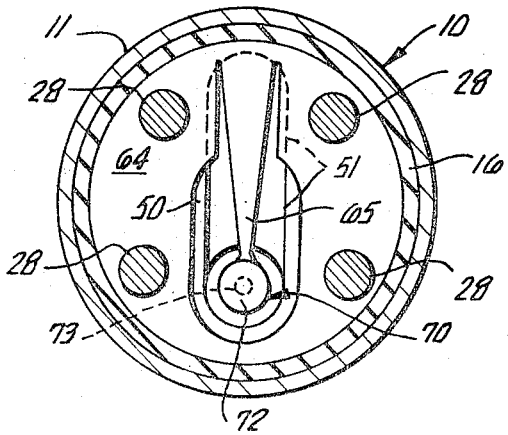
FIG. 4 is a view on line 4-4 of FIG. 1.
Figure 5:
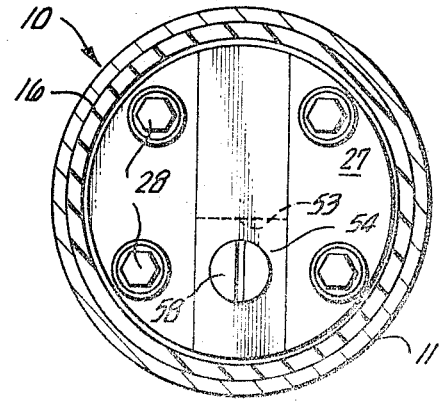
FIG. 5 is a view on line 5-5 of FIG. 1.

Mounting block 26 has an inner face 33 which defines a recess 34 extending thereacross, as best seen in FIG. 3. A threaded bore 35 extends from one end of recess 34 through block 26. After bore 35 has been drilled and threaded, a lateral cut 36 is formed part way through the block across the bore. Cut 36 defines an integral locking arm 37 at the left end (as seen in FIG. 1) of block 26. Before contactor assembly 25 is assembled, arm 37 is bent to the right or toward inner face 33 into a stable position shown in phantom line in FIG. 1. An annular recess 39 is formed around the periphery of the left end of block 26 to provide clearance for flexure of arm 37 without dragging or binding on the inner surface of annular flange 18.

An adjustable fixed-contact assembly 42 includes an externally threaded sleeve 43 to the interior of which is sealed an insulating bushing 44 of a material such as glass or ceramic. A terminal post 45 having a connecting lead 46 extending therefrom, is sealed through the center of bushing 44. One end of the terminal post extends away from sleeve 43 and carries a precious metal-fixed contact 47. The fixed-contact assembly is secured in mounting block 26 by screwing sleeve 43 into threaded bore 35, and a screwdriver slot 48 is provided in sleeve 43 for this purpose. As sleeve 43 is threaded through arm 37 into the main body of block 26, arm 37 is forced away from the bent position shown in phantom in FIG. 1 into its original position before being bent. Arm 37, however, is resiliently urged toward the bent or deformed position, and thus exerts a locking force on sleeve 43 which holds the fixed-contact assembly at any desired position in threaded bore 35.

Stop mounting block 27 has an inner face 50 defining a recess 51 in alignment with recess 34 in block 26. A threaded bore 52 is formed through block 27 in axial alignment with bore 35 is block 26. A lateral cut 53 is made part way through block 27 across bore 52 to define a locking arm 54. Arm 54 is deformed into the position shown in phantom line in FIG. 1, and an annular recess 55 is formed around the periphery of block 27 to prevent the locking arm from binding or dragging on the inner surface of flange 16. A threaded stud 58 is screwed into bore 52, and carries on its inner end a stop post 59. Installation of the stud in the threaded bore forces the locking arm to return to the position shown in solid line in FIG. 1, and the arm thus exerts a locking force on the stud just as described above with reference to fixed-contact assembly 42 and locking arm 37.

Figure 6:
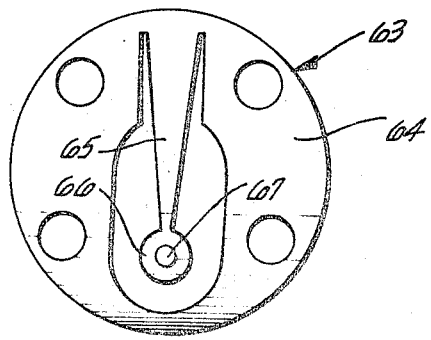
FIG. 6 is an elevation of a moving-contact spring for the switch.

A moving-contact assembly 63 includes a thin, flat disc 64 (best seen in FIGS. 6 and 7) which is tightly sandwiched between inner faces 33 and 50 of blocks 26 and 27. Disc 64 is formed of spring metal such as beryllium copper, and is centrally apertured to define an integral tapered leaf spring 65. The spring is tapered to provide constant internal stress along the length of the spring when it is bent out of the plane of disc 64. The free end of the spring defines a generally circular enlarged portion 66 having a central hole 67 therethrough.

A movable contact 70 is formed in two halves 71 and 72 mounted on opposite sides of enlarged portion 66 of the spring. Contact half 71 has a post 73 extending therefrom through central hole 67 in the enlarged portion into a mating socket 74 in contact half 72. The contacts are soldered together to be rigidly secured on opposite sides of the spring. The movable contact serves the dual purpose of an electrical contact and a seismic mass, and is therefore formed of a massive and highly conductive precious metal such as gold.

Figure 7:
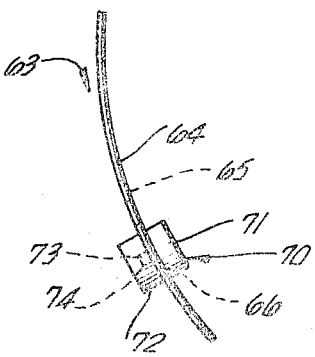
FIG. 7 is a side view of the spring shown in FIG. 6 with the spring leaf formed in a precurved position and carrying a fixed contact.

Before being sandwiched between blocks 26 and 27, disc 64 and leaf spring 65 of the moving-contact assembly are precurved with a circular radius as shown in FIG. 7. This is done by clamping the disc and leaf spring over a cylindrical mandrel, and then heat treating so the metal member takes a "set" in the cylindrically curved shape. The extent of deformation is determined by the set point or number of "g's" which the switch is to sense before actuation. In a typical unit, disc 64 is fabricated such that the leaf spring and contacts have a spring rate of about 0.006 inch (deflection of the fixed contact) per "g" of acceleration in the sensitive axis normal to the plane of the disc. If the switch is to actuate at say 2 g's, enlarged portion 66 is bent out of the original plane of disc 64 by 0.012 inch. That is, the spring is formed into the deflection which it would assume if subjected to its set-point load. If contactor assembly 25 is to provide a contact closure when subjected to the set-point acceleration, the spring leaf is bent toward stop post 59 as indicated in phantom in FIG. 1.

Moving-contact assembly 63 is next secured between blocks 26 and 27 to flatten disc 64, and leaf spring 65 extends within a chamber defined by recesses 34 and 51 in the inner faces of the mounting blocks. Stud 58 is then threaded into the block so stop post 59 rests against movable contact 70. Stud 58 is advanced until the leaf spring has been driven back into the flat major plane of disc 64. Movable contact 70 is urged against stop post 59 by spring 65 with a restoring force which is equivalent to that which the moving-contact assembly would experience when subjected to its set-point acceleration.

The movable contact will thus remain against stop post 59 until the contactor assembly is moved to the right (as viewed in FIG. 1) with an acceleration sufficient to overcome the restoring force of the spring and move the moving contact to the left against fixed contact 47 to close the switch. Very precise control over the set point is provided by varying the position of threaded stud 58 to vary the amount of restoring force exerted by leaf spring 65 and hence the amount of force which must be overcome by accelerating the contactor sufficiently to move the movable contact away from stop post 59 into contact with fixed contact 47.

Preferably, fixed-contact assembly 42 is threaded into bore 35 until contact 47 is within 0.001 inch or less of the movable contact. The cantilevered leaf spring and movable contact are thus constrained to a travel of 0.001 inch or less, and a very short time is required to move the contactor between an open and a closed position. Due to the constant-stress design of the spring, it is flat and in the plane of disc 64 (and hence perpendicular to the sensitive axis of the switch) when adjusted to the desired set point. This planar configuration reduces cross-axis acceleration response to a minimum, and the constant-stress design of the spring gives a lower stress for any given range and also reduces the possibility of creep or drift under long-term loads. Although a constant-stress spring is preferred, other spring configurations (such as, for example, a parabolically curved spring) which are planar and normal to the sensitive axis when confined between the fixed contact and stop post are also useful.

Contactor assembly 25 can also be arranged to provide a normally closed set of contacts below a preset acceleration level. In this case, leaf spring 65 is bent in the opposite direction from that shown in phantom in FIG. 1 to be urged against fixed contact 47 when disc 64 is assembled between mounting blocks 26 and 27. That is, movable contact 70 will remain against fixed contact 47 to close the contactor assembly until the switch is moved to the left (as viewed in FIG. 1) with an acceleration sufficient to break the contacts and move the movable contact to the right against stop post 59. Just as in the "normally open" switch described above, stop post 59 and fixed contact assembly 42 are adjusted in their respective threaded bores such that the total travel of the leaf spring is 0.001 inch or less. In this configuration, the stop post and fixed contact act as mechanical snubbers to provide damping to reasonably high frequencies, and response time of the switch at the set-point acceleration is minimized. If additional damping is required in a specific application, the chamber around leaf spring 65 may be filled with a conventional viscous damping fluid.

In some applications, it may be desirable to form contactor assembly 25 as a "double-throw" switch. In such cases, stop post 59 is formed of a precious metal-contact material, and this post is extended axially through threaded stud 58 which is in turn formed of an electrically insulating material. A connecting lead (not shown) is then secured to the end of the stop post and fed back through a recess (not shown) in flanges 16 and 18 to the components on circuit board 20. Alternatively, threaded bore 52 can be enlarged to the same size as bore 35, and a second fixed-contact assembly 42 inserted in the enlarged bore.

Figure 8:
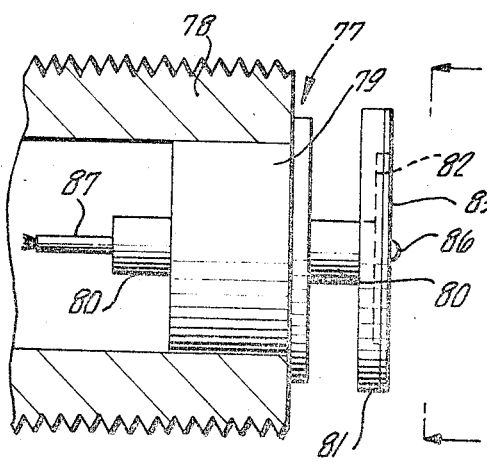
FIG. 8 is a side elevation of a soft fixed-contact assembly.
Figure 9:
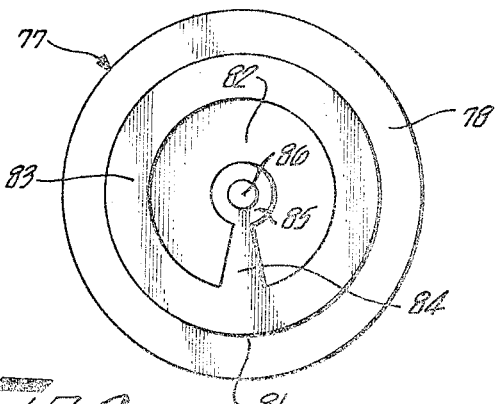
FIG. 9 is a view on line 9-9 of FIG. 8.

An alternative form of a fixed-contact assembly 77 is shown in FIGS. 8 and 9. This assembly includes an externally threaded sleeve 78 which is threaded into bore 35 in place of assembly 42. An insulating bushing 79 is sealed in one end of the sleeve, and an electrically conducting post 80 extends through the bushing. An enlarged head or button 81 is formed at the outer end of post 80, and the outer face of the button has a recess 82. A disc 83, formed of spring material such as beryllium copper, is welded to the outer face of the button over recess 82. The central part of the disc is apertured to define a cantilevered tapered leaf spring 84 having an enlarged head 85. A precious metal-contact 86 is secured to the enlarged head. A connecting lead 87 is soldered to the inner end of post 80 and is in electrical connection with contact 86 through post 80, button 81, disc 83 and spring 84.

Assembly 77 provides a "soft" contact because contact 86 is movable within a limited range as spring 84 is deflected into recess 82. That is, spring 84 deflects into the recess when contact 86 is impacted by movable contact 70 on the moving-contact assembly. The "soft" fixed contact is advantageous in that it reduces the impact of the several contacts when the switch is excited by high-frequency vibration. The contacts further meet with a wiping action which keeps them clean, and the friction generated thereby tends to reduce resonant problems at some vibratory frequencies. Longer life of the switch contacts is also provided by using a "soft" fixed contact.

Whether "soft" or "hard" contacts are used, the fixed contact and stop post are preferably adjusted to limit the total travel of the movable contact to about 0.001 inch. This close spacing confines leaf spring 65 to a substantially flat configuration so response to cross-axis inputs is minimized over the full operating range of the switch. Short travel of the moving contact has the further advantage of providing fast response time, and the fixed contact and stop post (or second fixed contact in a double-throw configuration) snub or damp the leaf spring if the switch is vibrated at frequencies close to the resonant frequency of the spring.

Circuit board 20 carries an electronic circuit means which serves several important functions in switch 10. The circuit has a current output which is adequate to drive a relay (which can be a relay 90 mounted on the circuit board in the switch housing) or other device to be actuated when the set-point acceleration is sensed by contactor assembly 25. Voltage and current at the contacts of the contactor assembly, however, are very small, leading to extended life of these contacts. This circuit also provides control over contact bounce which may arise when the switch is subjected to vibratory inputs along with the static acceleration to be sensed. Furthermore, the circuit can be used to modify the opening and closing characteristics of the switch such that a basic contactor assembly can be adapted for use in a variety of different applications.

Figure 10:
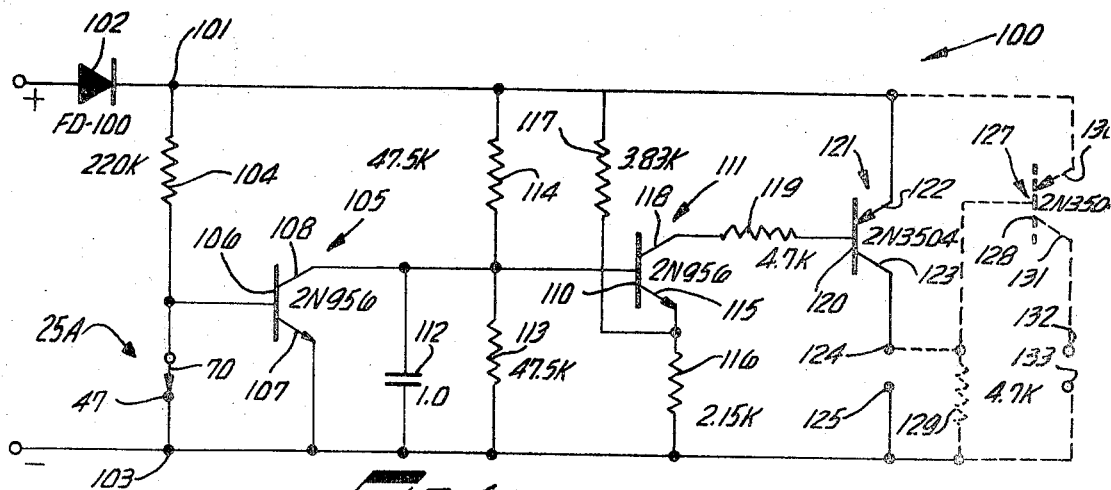

FIG. 10 shows a circuit 100 suitable for use with a contactor assembly 25A in which movable contact 70 is resiliently urged against fixed contact 47 by leaf spring 65 until the set-point acceleration is reached. That is, the contactor assembly is arranged as a normally closed switch which opens only when subjected to accelerations along the sensitive axis at a level equal to or greater than the set-point acceleration.

Circuit 100 has a positive terminal 101 for connection to a voltage source (not shown) through a protective diode 102, and the circuit also has a negative terminal 103 for connection to the voltage source. Fixed contact 47 of the contactor assembly is connected to the negative terminal, and movable contact 70 is connected to the positive terminal through a resistor 104. An NPN transistor 105 has a base 106 connected to the junction of resistor 104 and movable contact 70. Transistor 105 has an emitter 107 connected to negative terminal 103, and a collector 108 connected to a base terminal 110 of a second transistor 111. A capacitor 112 and a resistor 113 are connected in parallel between collector 108 and negative terminal 103, and a resistor 114 is connected from collector 108 to positive terminal 101.

Second transistor 111 has an emitter 115 connected to negative terminal 103 through a resistor 116, and to positive terminal 101 through a resistor 117. Second transistor 111 further has a collector 118 connected through a resistor 119 to a base 120 of a third transistor 121 having an emitter 122 connected to positive terminal 101. The third transistor has a collector 123 connected to a first output terminal 124, and a second output terminal 125 is connected to negative terminal 103. A device to be actuated, such as a relay, is connected across output terminals 124 and 125.

In operation, contactor assembly 25A remains closed until the set-point acceleration is sensed. When the contactor assembly is closed, transistor 105 does not conduct, and the resulting current to base 110 causes second transistor 111 to conduct. Third transistor 121 is forward biased and also conducts, causing a current to flow through the device coupled across the output terminals of the switch. When contactor assembly 25A is opened by subjecting the switch to the set-point acceleration, transistor 105 conducts and cuts off transistors 111 and 121. That is, when the contactor assembly opens, the current passing through the device coupled to the output terminals of the switch drops to zero. Capacitor 112 charges when the contactor assembly closes, but the charging time of this capacitor provides a "slow close" characteristic for the switch. The output current of the switch, however, terminates immediately upon opening of contactor assembly 25A. That is, the "total switch" represented by circuit 100 discriminates against vibratory inputs and has the characteristic of slow closing and fast opening, the switch being normally closed until it is subjected to accelerations at or above the set-point acceleration.

Circuit 100 is readily modified to provide a "total switch" which is normally open with a fast-close slow-open characteristic. This modification requires only the addition of the components shown in phantom in FIG. 10. In this modified form, a fourth transistor 127 has a base 128 connected to collector 123 of third transistor 121, and to negative terminal 103 through a resistor 129. An emitter 130 of the fourth transistor is connected to positive terminal 101 and a collector 131 is connected to a first output terminal 132. A second output terminal 133 is connected to negative terminal 103, and a device to be actuated, such as a relay, is connected to the output terminals.

The addition of the extra stage shown in phantom in FIG. 10 provides a "total switch" having no output current (through the device coupled to the output terminals) when contactor 25A is closed, and having an output current when the contactor assembly is open. That is, the total switch becomes a normally open switch with fast-close slow-open characteristics.

Figure 11:
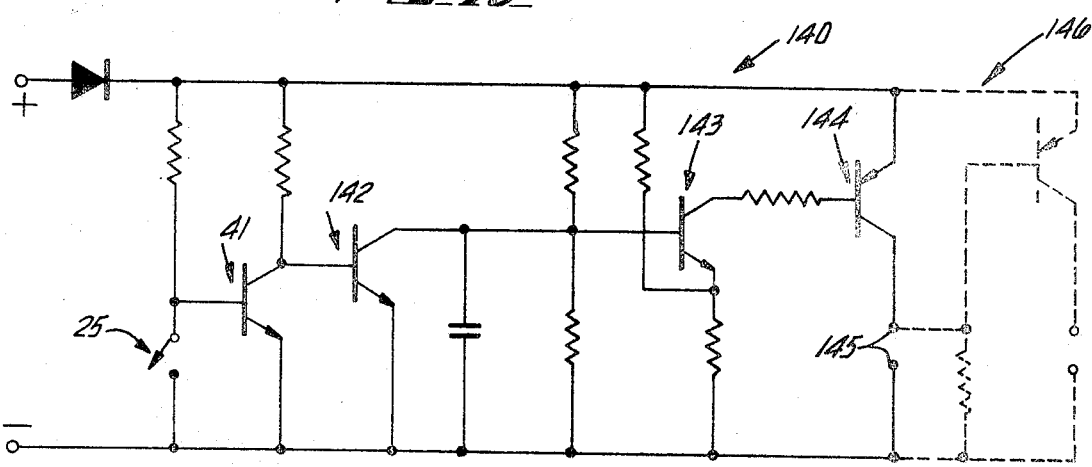

FIG. 11 shows a circuit 140 which is similar in many respects to circuit 100, but is arranged with fast-open slow-close characteristics to provide an output current when the contacts of contactor assembly 25 are open. That is, the "total switch" appears as a normally closed switch because an output current is present when the contactor assembly is open, and no output current appears when the contacts of the contactor assembly are closed.

Circuit 140 has four transistors 141, 142, 143 and 144. Contactor assembly 25 remains open until the set-point acceleration is sensed. When the contactor assembly is open, transistor 141 conducts and cuts off the base-emitter current to transistor 142, causing transistor 142 not to conduct. In this mode, transistors 143 and 144 (a forward-biased transistor) also conduct, and an output current therefore flows through a device coupled to output terminals 145. When contactor assembly 25 closes at the set-point acceleration, transistor 141 ceases to conduct, and transistors 143 and 144 are also cutoff such that closure of contactor assembly 25 terminates current flow through a device connected to output terminals 145.

Circuit 140 can be modified as shown in phantom in FIG. 11 with an additional transistor stage 146 which gives the total switch a normally open configuration. That is, the circuit with the added stage delivers current to a device coupled to the output terminals when contactor assembly 25 is closed at the set-point acceleration, the total switch having a fast-close slow-open characteristic for vibratory discrimination.

In the circuit shown in FIG. 11, transistor 143 is an NPN transistor. If a PNP transistor (with its emitter coupled through a resistor to the base of transistor 144, and its collector connected through a resistor to the negative output terminal) is instead used for transistor 143, the circuit shown in solid line is useful with a normally closed contactor assembly to provide a normally open total-switch output with fast-open slow-close characteristics. The addition of the extra stage shown in phantom in FIG. 11 modifies these characteristics such that a normally closed contactor assembly 25 results in a normally closed total switch with fast-close slow-open characteristics.

Figure 12:
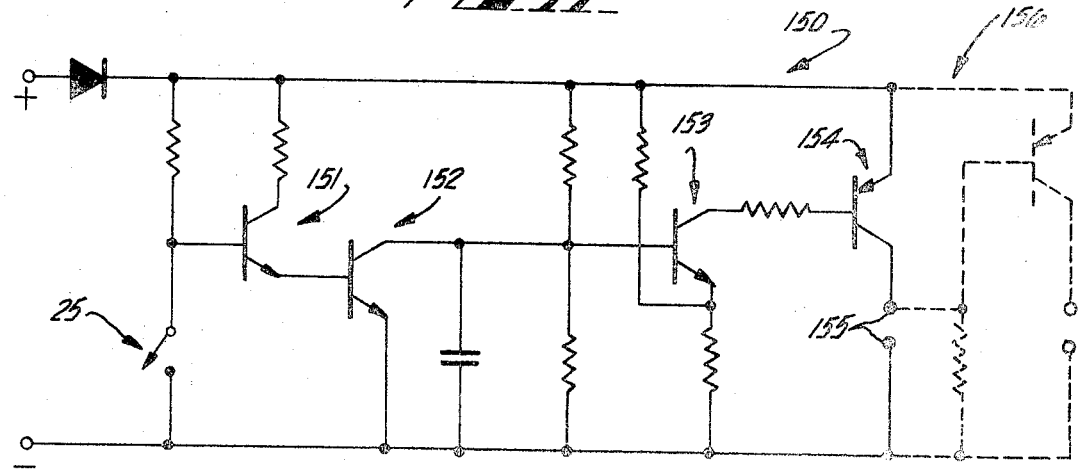

FIG. 12 shows another circuit 150 for use with a normally open contactor assembly 25 having contacts which do not close until the switch is subjected to the set-point acceleration. The circuit uses four transistors 151, 152, 153 and 154, and is arranged as a normally open total switch which provides an output current to a device coupled to output terminals 155 only when the contacts of contactor assembly 25 are closed, the total switch having a fast-open slow-close characteristic.

When the total switch shown in FIG. 12 is subjected to accelerations less than the set-point acceleration, contactor assembly 25 is open and transistor 151 conducts and this output in turn causes transistor 152 to conduct. In this mode, transistors 153 and 154 are cutoff, and no output current flows through a device connected to output terminals 155. The total switch thus has a normally open characteristic, and current is delivered to a device connected across the output terminals only when the contactor assembly is closed. An additional stage 156, shown in phantom in FIG. 12, can be added to give the total switch a normally closed configuration such that current flows through a device connected to output terminals 155 whenever contactor assembly 25 is open, the modified total switch having a fast-close slow-open characteristic.

FIG. 13 shows a circuit 160 adapted for use in applications where static acceleration is to be sensed in the presence of a relatively high level of vibration. Such vibration can cause chatter of the contactor assembly either before or after the set-point acceleration level to be sensed has been reached. The circuit has the characteristic of canceling the vibratory response of the switch and providing an output indication responsive only to static set-point acceleration.

Circuit 160 has a positive terminal 161 for connection to a voltage source (not shown) through a protective diode 162, and a negative terminal 163 for connection to the voltage source. One side of contactor assembly 25 is connected to negative terminal 163, and the other side of the contactor assembly is connected to positive terminal 161 through a resistor 164. A capacitor 165 is connected across the contacts in contactor assembly 25 to reduce the effects of contact bounce. A transistor 167 has a base connected to the junction of the contactor assembly and resistor 164, an emitter connected to negative terminal 163, and a collector connected to positive terminal 161 through a resistor 168. The collector of transistor 167 is also connected to the base of a second transistor 169 having an emitter connected to negative terminal 163, and a collector connected to the positive terminal through a resistor 170.

A filter is formed from a pair of series-connected resistors 171 and 172 connected from the collector of transistor 169 to the base of a third transistor 174, and a capacitor 176 is connected from the junction of resistors 171 and 172 to the negative terminal. Transistor 174 has an emitter connected to an emitter of a fourth transistor 178, and the two emitters are in turn connected to negative terminal 163 through a resistor 179. The collector of transistor 178 is connected to the positive terminal, and the base of transistor 178 is connected to the junction of a pair of series-connected resistors 180 and 181 connected between positive terminal 161 and negative terminal 163.

The collector of transistor 174 is connected to a base of a fifth transistor 183 having an emitter connected to positive terminal 161 and a collector connected through a pair of series-connected resistors 184 and 185 to negative terminal 163. A capacitor 186, forming part of the filter network, is connected from the junction of resistors 184 and 185 to the base of transistor 174. The collector of transistor 183 is also coupled through a resistor 187 to the gate of a silicon controlled rectifier 188 having a cathode connected to negative terminal 163 and an anode connected to a negative output terminal 190. Positive terminal 161 is both a positive input terminal and a positive output terminal for the circuit. That is, a device such as a relay which is to be controlled by the total switch is connected across terminal 161 and negative output terminal 190.

The effect of circuit 160 is to integrate the action of contactor assembly 25 such that the total switch is sensitive to static acceleration and substantially insensitive to vibratory inputs. That is, when the contactor assembly is chattering in response to high-level vibratory inputs, the silicon controlled rectifier will conduct only when the average closure time of the contactor assembly exceeds its average time in an open condition.

FIG. 14 shows shows another circuit 195 arranged to sense static acceleration in the presence of high-level vibratory inputs. Circuit 195 uses a double-throw contactor assembly 25B having a pair of fixed contacts. That is, stop post 59 of the contactor assembly is replaced with a second fixed contact as described above in conjunction with the discussion of the contactor assembly.

Circuit 195 is arranged such that a static acceleration level in excess of the set-point acceleration closes the switch as shown in FIG. 14 to activate a portion of the circuit including three transistors 196, 197 and 198, placing substantially the input voltage to the circuit across a capacitor 199 forming the input of a filtering or integration network 200. When the static acceleration is less than the preset level, contactor assembly 25B changes position to activate a circuit including transistors 202 and 203 which cancels the voltage across capacitor 199.

When the switch is subjected to high-level vibration, the moving contact of the contactor assembly will chatter or vibrate between the two fixed contacts. The voltage drop across capacitor 199 will then be a rectangular waveform, but filter network 200 smooths this waveform into an essentially constant voltage at the base of a transistor 204. Transistors 196, 197, 198, 202 and 203 are coupled through resistors to a positive input terminal 205 of the circuit such that these transistors cooperate with double-throw contactor assembly 25B in a proportional time-sharing fashion. That is, when the static acceleration level exceeds the set-point acceleration in the presence of heavy vibration, the ON time of the switch (producing a voltage across capacitor 199) is greater than the OFF time, and when the static acceleration level is less than the set-point acceleration in the presence of heavy vibration, the ON time is less than the OFF time. When the static acceleration is equal to the set-point acceleration in the presence of heavy vibration, the ON time and OFF time are equal.

Transistor 204, in combination with two additional transistors 206 and 207, forms a logical circuit with network 200 which provides the desired discrimination against vibratory inputs. That is, the circuit integrates the ON and OFF times of the switch, and uses the integrated signal as a measure of the static acceleration level. Transistor 206 establishes the voltage of the emitter of transistor 204 at a level such that transistor 204 will conduct when its base voltage exceeds one-half the input voltage applied to the circuit. Network 200 acts to impose the average of the rectangular-waveform voltage across capacitor 199 at the base of transistor 204. When this average voltage exceeds one-half of the input voltage (as occurs when the static acceleration exceeds the set-point acceleration) transistor 204 conducts. Transistor 207 is forward biased so it conducts when transistor 204 conducts to close the total switch and provide a power output to a device coupled across output terminals 209 (one of which is connected to a negative input terminal 210 and the other of which is connected to the collector of transistor 207). Conversely, when the average voltage is less than one-half the input voltage (as occurs when the static acceleration is less than the set-point acceleration), transistor 204 does not conduct, and transistor 207 is rendered nonconducting and the switch is effectively open such that no output current is delivered to a device coupled across the output terminals.

There has been described a novel acceleration switch incorporating a contactor assembly having rapid response and low sensitivity to cross-axis accelerations. The contactor assembly is coupled to an electronic circuit which modifies the closure characteristics of the total switch and discriminates against vibratory inputs which may be present along with the static acceleration to be sensed by the switch. The unit is small and rugged, and has a long life due to the very low voltage and current applied to the contacts of the contactor assembly.

Miniaturization of electronic components permits the entire switch assembly to be housed in a package approximately three-quarters of an inch in diameter and 1½ to 2 inches long. Additional discrimination against external vibration can be provided by shock mounting the case of the device to the supporting structure on which the case is mounted. Although the switch has been described as using a constant-stress leaf spring in the contactor assembly, other forms of moving-contact units are also useful. For example, the leaf spring can be replaced by a substantially rigid flat blade which is supported by a torsion pivot. In either form, the moving components of the switch are substantially flat and normal to the sensitive axis of the switch, reducing cross-axis sensitivity to a minimum.

Several different types of electronic circuits have been shown for use in conjunction with the contactor assembly of the switch. It is to be understood that other types of circuits can also be used to modify the output characteristics of the total switch. All such variations of electronic circuitry and mechanical switch components are intended to be encompassed within the scope of the invention as defined in the following claims.

I claim:
1. An acceleration switch, comprising:
   a housing;
   a fixed contact mounted in the housing;
   a movable contact;
   an elongated and precurved leaf spring secured to the movable contact and to the housing for resiliently supporting the movable contact to be movable against and away from the fixed contact to operate the switch in response to acceleration along a sensitive axis of the switch;
   a stop member mounted in the case, the movable contact being positioned between the fixed contact and the stop member to confine the leaf spring to a substantially flat configuration having a major plane which is normal to the sensitive axis; and
   circuit means coupled to the fixed and movable contacts and actuable by the contacts to provide a first output condition when the acceleration is below a preset level and a second output condition when the acceleration is at least as high as the preset level.

2. The acceleration switch defined in claim 1 in which the circuit means is disposed in the housing, and in which the stop member is adjustably positionable in a direction parallel to the sensitive axis of the switch.

3. The acceleration switch defined in claim 2 in which the fixed contact is adjustably positionable in a direction parallel to the sensitive axis whereby the fixed contact and stop member are adjustable to vary the preset acceleration level of the switch and the travel of the movable contact.

4. The acceleration switch defined in claim 3 in which the fixed contact is resiliently supported to be movable within a limited range when contacted by the movable contact.

5. The acceleration switch defined in claim 3 in which the circuit means includes means for modifying the effective opening and closing time of the switch by delaying a change in one of the output conditions in response to a change in relative position of the fixed and movable contacts.

6. The acceleration switch defined in claim 5 in which the circuit means includes means for suppressing switch response to vibratory inputs while retaining sensitivity to static acceleration inputs.

7. The acceleration switch defined in claim 3 in which the stop member carries a second fixed contact coupled to the circuit means, the movable contact closing a circuit with one of the fixed contacts when the switch is subjected to acceleration below the preset level, and closing a circuit with the other of the fixed contacts when the switch is subjected to acceleration above the preset level.

8. The acceleration switch defined in claim 7 in which the circuit means includes means for suppressing switch response to vibratory inputs while retaining sensitivity to static acceleration inputs.

9. The acceleration switch defined in claim 3 in which the circuit means has an electric-current output in one of the output conditions.